US006584483B1

(12) United States Patent
Altus et al.

(10) Patent No.: US 6,584,483 B1
(45) Date of Patent: Jun. 24, 2003

(54) SYSTEM AND METHOD FOR EFFICIENT HARDWARE IMPLEMENTATION OF A PERFECT PRECISION BLENDING FUNCTION

(75) Inventors: Tom Altus, Haifa (IL); Jacob D. Doweck, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/475,456

(22) Filed: Dec. 30, 1999

(51) Int. Cl.[7] .............................. G06F 7/52; G06F 7/00
(52) U.S. Cl. ........................................ 708/620; 708/603
(58) Field of Search ................................ 708/620, 316, 708/319, 603

(56) References Cited

U.S. PATENT DOCUMENTS 4,789,953 A * 12/1988 Gerrath ....................... 708/300
5,130,942 A * 7/1992 Enari .......................... 708/316
6,032,171 A * 2/2000 Kiriaki et al. ............... 708/316

* cited by examiner

Primary Examiner—Tan V. Mai
(74) Attorney, Agent, or Firm—Kenyon & Kenyon

(57) ABSTRACT

The present invention is directed to an apparatus and method for efficiently calculating an intermediate value between a first end value and a second end value such that the area and time required to implement this operation is minimized. The present invention is also used to efficiently multiply a value by a fraction. A fraction is involved in calculating an intermediate value and also for multiplying by a fraction. When the denominator of the fraction is odd, the binary representation of the blending function, which is used to calculate an intermediate value, exhibits special characteristics. The special characteristics allow the present invention to, among others, avoid the use of multipliers, which require a large number of gates to implement. This invention exploits this and other special characteristics in order to efficiently implement in hardware the blending function and to efficiently multiply a value by a fraction.

6 Claims, 8 Drawing Sheets

SYSTEM AND METHOD FOR EFFICIENT HARDWARE IMPLEMENTATION OF A PERFECT PRECISION BLENDING FUNCTION

BACKGROUND OF THE INVENTION

I. Field of the Invention

This invention relates generally to computer technology, and more particularly, to efficient hardware design.

II. Background Information

Calculating intermediate values between two numbers is a common task. For example, intermediate values are required to blend colors in video processing applications. In addition, calculating intermediate values is common in hardware compression and decompression algorithms. Since the task of calculating intermediate values involves multiplying by a fraction, it consists mainly of dividing by the denominator of the fraction. Every fraction whose denominator is odd has an endless sequence of digits in the fraction's binary representation. For example, $1/7 = 0.001001001\ldots_{binary}$, $1/3 = 0.010101\ldots_{binary}$, and $2/5 = 0.011001100110\ldots_{binary}$. When the denominator is an odd number, the division might be inaccurate even when using common rounding techniques, since the binary fraction is an endless sequence of digits. A binary number is a base 2 number (i.e., $1001 = 2^0 + 2^3 = 9$).

One method for rounding the result is to add $1/2$ ($0.1_{binary}$) to the total and truncating the remaining digits after the decimal point, so that fractions greater than or equal to $1/2$ are rounded up, and fractions less than $1/2$ are rounded down (i.e., the value is not changed). For example, $1.1_{binary}$ would round up to 2 ($1.1_{binary} + 0.1_{binary} = 10.0_{binary}$), whereas $1.01_{binary}$ would round down to 1.0 ($1.01_{binary} + 0.1_{binary} = 1.11_{binary}$ and the remaining digits after the decimal point are truncated).

Adding $1/2$ and truncating is not accurate enough when the denominator is odd so one method for improving accuracy is to add a lookup table to round the result, placed either before or after the division required to calculate the intermediate value. The problem with this and other methods for improving accuracy is that implementing them requires a large number of gates which is costly in terms of the chip area and processing time.

A blending function calculates an intermediate value. The blending function has the following formula: round(P*X+(1−P)*Y), where X and Y are integers, and P is a fraction between 0 and 1. The blending function is used, for example, to blend colors of three dimensional ("3-D") objects.

Referring to the figures in which like numerals indicate like elements, FIG. 1a shows the hardware involved in a typical, intuitive implementation of the blending function. A multiplier 100 (in the figures, the multiplier is abbreviated to "mul" in order to conserve space and maintain clarity) is used to multiply the inputs together producing a multiplier output. An adder 110 is used to add the inputs together producing an output. The $1/2$ is added to round off the result.

FIG. 1a shows how the typical hardware implementation for the blending function calculates a result given that X and Y are 12-bit inputs, and P is a fraction with a denominator of 5 and a numerator between 0 and the denominator (i.e., 1, 2, 3, or 4). In FIG. 1a, multiplier 100 to the left of adder 110 and is the top-most is used to multiply X and P's numerator. P's numerator can be either 1, 2, 3, or 4. Multiplier 100 to the left of adder 110 and to the bottom is used to multiply Y and (1−P)'s numerator. (1−P)'s numerator can be either 4, 3, 2, or 1. Adder 110 adds the results of these two multiplications together and sends the result of the addition to multiplier 100 located to the right of adder 110. This multiplier multiplies the result from adder 110 with the binary representation for $1/5$ which is approximately 0.0011001100110011. Note that the result from this multiplication is accurate to 12 bits. One-half is added to this result for rounding purposes. The digits after the decimal point can be truncated to produce a rounded whole number result.

The blending function and numerous other functions multiply a value by a fraction. Multiplying a value by a fraction uses the formula: round(P*X) where X is a binary integer, and P is a fraction between 0 and 1. The same problems that hinder the implementation of the blending function also hinder the implementation of multiplying a value by a fraction (e.g., the implementation requires an excessive number of gates).

FIG. 1b shows the hardware involved in a typical, intuitive implementation for multiplying a value by a fraction. FIG. 1b shows how this hardware cooperates in order to multiply a value by a fraction given that the value, X, is a 12-bit input, and the fraction, P, has a denominator of 5 and a numerator between 0 and the denominator. In FIG. 1b, multiplier 100 on the left side multiplies together X and P's numerator which can be either 1, 2, 3, or 4. Multiplier 100 on the right side multiplies this result with the binary representation for $1/5$ which is 0.0011001100110011. One-half is added to this result for rounding purposes. The digits after the decimal point can be truncated to produce a rounded whole number result.

The area required for the most efficient hardware implementation of the blending function shown in FIG. 1a is estimated to require 2415 gates (a gate on average has about 4 transistors). Multiplier 100 requires a much larger number of gates than adder 110. The computation time to perform the operation in FIG. 1a is determined by the path from X or Y through multiplier 100 on the left side of the page, adder 110, and multiplier 100 on the right side of the page. Multiplier 100 is usually implemented using several adders in series thus resulting in a long computation time. Therefore, in general, a hardware implementation of an operation using adders is more efficient in terms of space and computation time than a hardware implementation using multipliers.

SUMMARY OF THE INVENTION

The present invention is directed to an apparatus for calculating an intermediate value between a first value, X, and a second value, Y, as P*X+(1−P)*Y where P is a non-zero, non-unitary fraction value with an odd number denominator. An embodiment of the present invention includes a combined multiplication stage including two or more multiplexing devices, each having inputs to receive the first and second values, and each having a select input to receive a bit signal from a binary representation based on a numerator of the fraction value multiplied by a constant, c, and an adder coupled to the outputs of the multiplexing devices.

DETAILED DESCRIPTION

I. Overview

This invention allows efficient hardware implementation for calculating an intermediate value using the blending function: round(P*X+(1−P)*Y), where X and Y are binary integers, and P is a fraction between 0 and 1 whose denominator is a constant and an odd number. This invention also allows efficient hardware implementation for multiplying a value by a fraction as in: round(P*X), where X is a binary integer, and P is a fraction between 0 and 1 whose denominator is a constant and an odd number.

The two main advantages of this invention are:
1. Hardware efficiency in terms of the number of gates and time required to perform the above two operations compared to known methods
2. The result is as accurate as standard 32-bit arithmetic without requiring that the fraction, P, be represented with a large number of bits.

Figure 2:
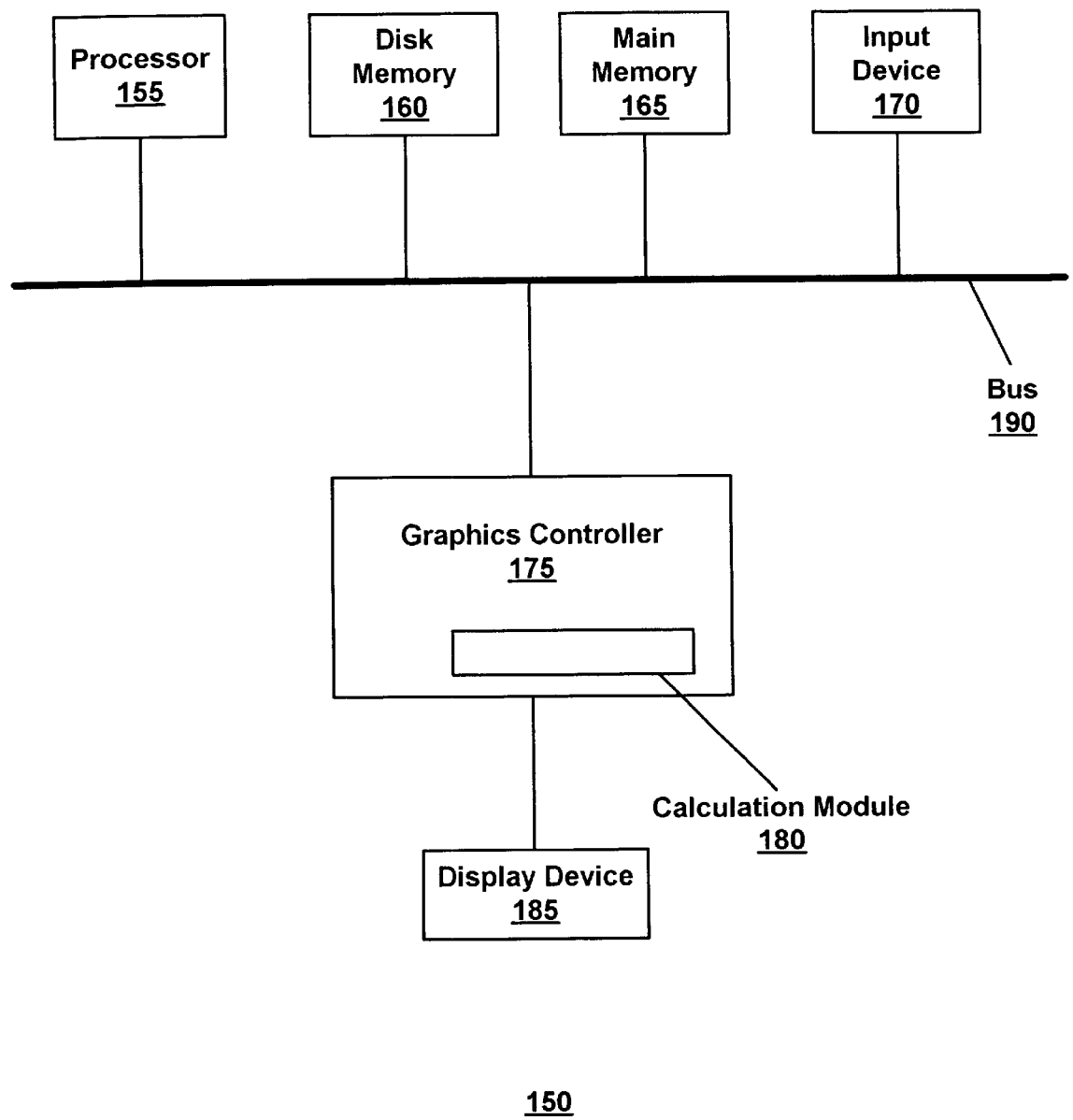
FIG. 2 is a block diagram illustrating a calculation module within a computer system according to one embodiment of the present invention.

FIG. 2 is a block diagram illustrating a calculation module 180 within a computer system 150 according to one embodiment of the present invention. Computer system 150 includes a processor 155, a disk memory 160, a main memory 165, a graphics controller 175, calculation module 180 that includes hardware for calculating an intermediate value or multiplying by a fraction, a display device 185, and an input device 170 such as a keyboard and mouse. The devices 155–185 are connected to a bus 190 which transfers data, i.e., instructions and information between each of the devices 155–185.

Processor 155 executes instructions and controls the operation of computer system 150. Processor 155 may be, for example, a Pentium® II processor available from Intel Corporation. Disk memory 160 and main memory 165 store data and programs. One difference between disk memory 160 and main memory 165 is that disk memory 160 is much slower than main memory 165. Graphics controller 175 grabs data from main memory 165 or disk memory 160 and formats it for later output to display device 185. Calculation module 180, the subject of an embodiment of the present invention, is located within graphics controller 175. Display device 185 is used to visually show output from graphics controller 175. Display device 185 may be a cathode ray tube or liquid crystal display monitor.

One possible scenario for drawing objects include processor 155 receiving user input regarding creating objects in 3-D space. Processor 155 transfers instructions regarding the size, location, color, etc. of such objects to graphics controller 175. In response, graphics controller 175 creates the object in displaying device space. When creating such objects, graphics controller 175 may need to invoke calculation module 180 in order to, for example, blend colors of the object.

The use of this invention, however, is not limited to 3-D processing and this invention does not have to be used in a graphics controller context. In an alternative embodiment, calculation module 180 can be used in a hardware compression and decompression algorithm.

II. Method Steps for Calculating an Intermediate Value

This invention applies to a blending function having the following formula: round(P*X+(1−P)*Y), where X is a first end value and Y is a second end value and both X and Y are binary integers which are n bits wide and have values between 0 and $2^n-1$. P is a fraction having a numerator and a denominator and where the denominator is a constant and an odd number and the numerator is between 0 and the denominator. The blending function is used to calculate an intermediate value between X and Y.

Figure 3:
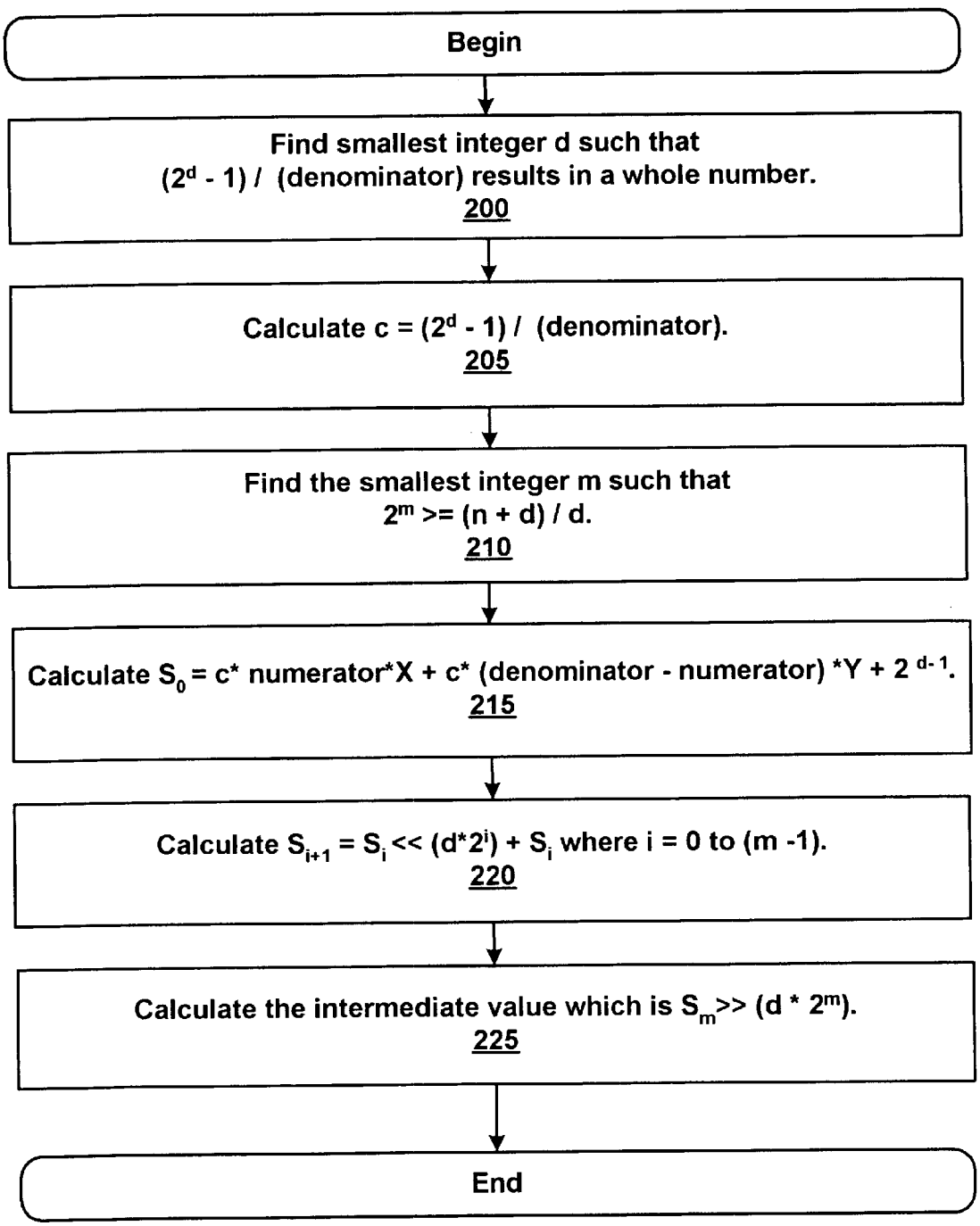
FIG. 3 is a flowchart illustrating the steps required to calculate an intermediate value in one embodiment of the present invention.

FIG. 3 is a flowchart illustrating the steps used to calculate an intermediate value, using the blending function, in one embodiment of the present invention. Steps 200, 205, and 210 are pre-implementation steps in that these steps calculate constants needed for the actual hardware implementation of the blending function. The actual hardware is implemented using steps 215, 220, and 225. In step 200, the smallest integer, d, is found such that $(2^d-1)/$(the denominator) results in a whole number. The smallest integer d represents the number of bits in a bit cycle (i.e., the repeating binary digits in a cyclic binary representation). If the number of bits in the bit cycle is d, then the denominator will evenly divide $2^d-1$.

In step 205, the number c is calculated where $c=(2^d-1)/$(the denominator). In step 210, the smallest integer m is found such that $2^m \geq (n+d)/d$. Each adder in the division stage (discussed in detail below) doubles the precision (i.e., the output from the adder is twice as precise as the input to that adder). Therefore, if integer m is the number of adders, then the final precision is: $d+2d+4d+\ldots+2^{m-1}*d=(2^m-1)*d$. This means that $(2^m-1)*d$ left-most digits are accurate. Therefore, in order to obtain a final precision of "n" digits, it is required that: $n \leq ((2^m-1)*d)$. This equation can be rewritten as: $2^m \geq (n+d)/d$.

In step 215, an initial result $S_0$ is calculated such that $S_0=c*$(numerator)$*X+c*$(denominator−numerator)$*Y+2^{d-1}$. In step 220, the intermediate results $S_{i+1}$ (i.e., $S_1$ to $S_m$) are calculated where $S_{i+1}=S_i+S_i<<(d*2_i)$ and where i=0 to (m−1). In other words, $S_{i+1}$ equals $S_i$ plus $S_i$ shifted to the left by $(d*2^i)$ places. In this specification, shifting a number by a specified number of places is the general term for shifting a binary representation of the number a specified number of bits.

Finally, in step 225, the intermediate value between X and Y is calculated such that the intermediate value is $S_m>>(d*2^m)$. In other words, the intermediate value is $S_m$ shifted to the right by $(d*2^m)$ places. $S_m$ is shifted this many places because after the combined multiplication stage, the output from the adder at this stage has (n+d) digits. Using the above calculation for m, the intermediate value after the division stage has the following number of digits: $(n+d)+(2^m-1)*d=n+2^m*d$. Because only n digit accuracy is required for the result (the inputs were n digits wide), the remaining digits are discarded meaning that $S_m$ is shifted $2^m*d$ digits to the right thus obtaining the result with n-digit accuracy.

Steps 200 to 210 calculate values that depend only on the denominator. If the denominator is constant, then c, d, and m are known before hardware implementation and thus the implementation starts at step 215. The multiplications in step 215 can be simplified due to the special characteristics of c. The coefficients c*numerator and c*(denominator−numerator), when represented in d binary digits, are the exact inverse of each other. In other words, there are always exactly d "1"s in the binary representation of c*numerator and c*(denominator−numerator). This means that the function c*numerator*X+c*(denominator−numerator)*Y can be implemented using only one adder which has d inputs.

For example, assume that the denominator equals 5, then d=4 and c=3 resulting in the coefficients having the following values for a numerator between 0 and 5:

numerator=0, c*numerator=0=0000, c*(denominator−numerator)=15=1111;

numerator=1, c*numerator=3=0011, c*(denominator−numerator)=12=1100;

numerator=2, c*numerator=6=0110, c*(denominator−numerator)=9=1001;

numerator=3, c*numerator=9=1001, c*(denominator−numerator)=6=0110;

numerator=4, c*numerator=12=1100, c*(denominator−numerator)=3=0011;

numerator=5, c*numerator=15=1111, c*(denominator−numerator)=0=0000;

As this example demonstrates, there are exactly 4 "1"s (the number of "1"s equals d) in each row. Therefore, the hardware implementation for c*numerator*X+c*(denominator−numerator)*Y is simplified to a 4-input adder, each of the inputs is derived from a multiplexer that chooses between the binary integers X or Y.

III. Hardware Implementation for Calculating an Intermediate Value

Figure 4:
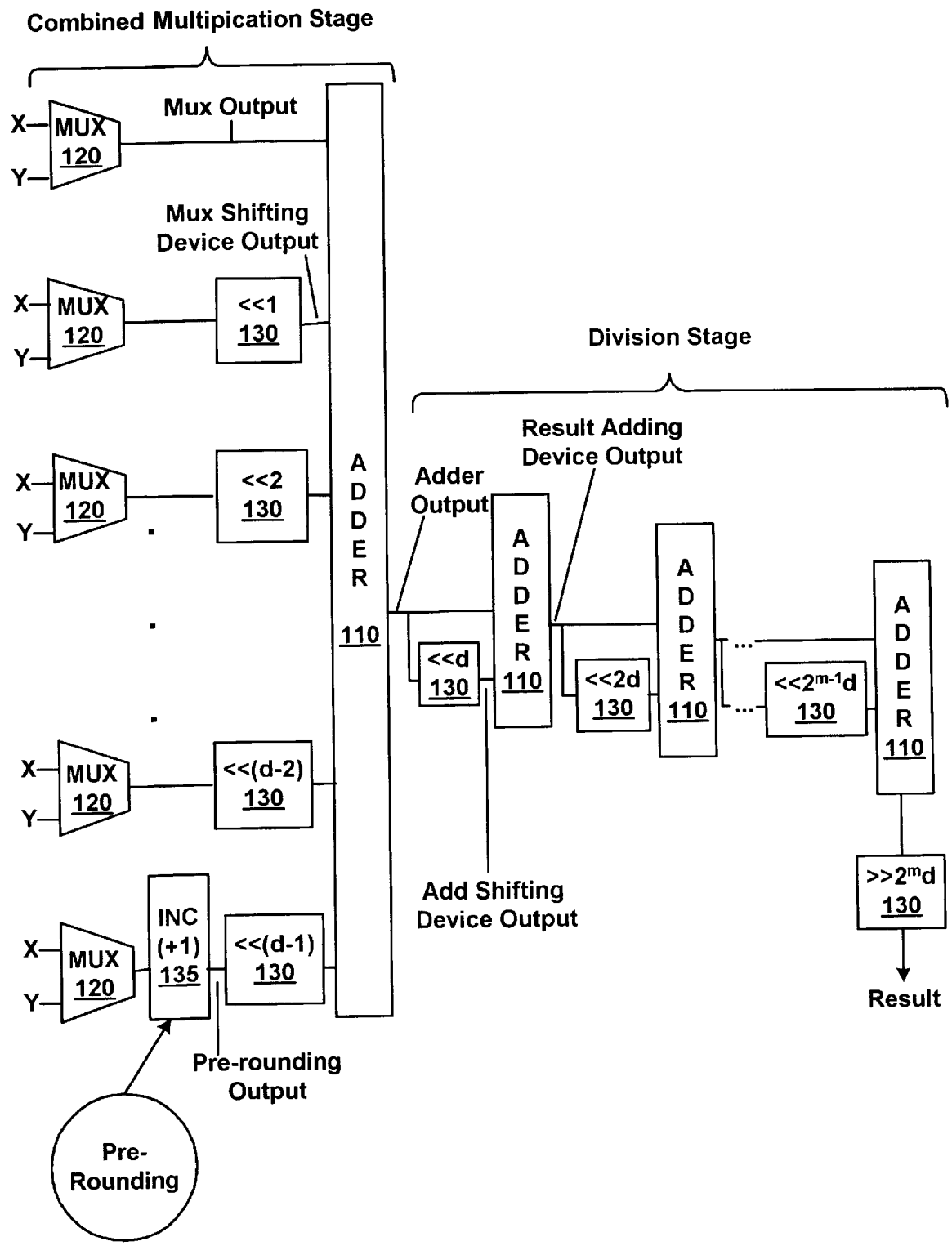
FIG. 4 is a block diagram illustrating the hardware involved in calculating an intermediate value in one embodiment of the present invention.

FIG. 4 is a block diagram illustrating the hardware involved in calculating an intermediate value in one embodiment of the present invention. A multiplexing device, such as a multiplexer 120 (in the figures, the multiplexer is abbreviated to "mux" in order to conserve space) is used to select an output given two or more inputs. A shifting device, such as a shifter 130 (in the figures, the shifter is abbreviated to a rectangle which specifies the direction that the input should be shifted where "<<" indicates shifting to the left and ">>" indicates shifting to the right and also the number of places (bits) that should be shifted is also specified; e.g., <<2 indicates that the output is the input shifted two bits to the left), is used to produce an output that shifts the input a specified number of places and the shifting is done in the specified direction. Shifter 130 is not an actual device but rather implemented by connecting the output of a first device into the input of a second device such that the output of the first device is shifted in a specified direction. Adder 110, as explained earlier, produces an output which is the addition of all the inputs. An incrementing device, such as an incrementor 135 (in the figures, the incrementor is abbreviated to "inc" in order to conserve space), is used to produce an output which adds one to an input. The hardware in FIG. 4 can be separated into the following two stages: (1) a combined multiplication stage including a pre-rounding substage; and (2) a division stage.

A. Combined Multiplication Stage

1. Calculating $S_0$

As stated earlier, in step 215 of FIG. 3, the initial result, $S_0$, is calculated using the following formula: $S_0 = c*$(numerator)$*X + c*$(denominator−numerator)$*Y + 2^{d-1}$. The combined multiplication stage calculates the function: c*(numerator)*X+c*(denominator−numerator)*Y. The implementation of this function is simplified due to the special characteristics of c. The coefficients (c*numerator) and (c*(denominator−numerator)), when represented in d binary digits, are the exact inverse of each other. Thus the function c*numerator*X+c*(denominator−numerator)*Y can be implemented using only one adder with d inputs.

In FIG. 4, multiplexer 120 is used to select between the first end value X or the second end value Y producing a mux output which is either X or Y. Multiplexer 120 contains one or more select inputs which is used to gate the several inputs to a single output. In one embodiment, the binary representation based on (c*numerator) is the select input which is used to select either X or Y as the output of multiplexer 120.

There are d number of multiplexers used to select either X or Y. In one embodiment, the d number of multiplexers are distributed such that the top-most multiplexer in FIG. 4 is the 1st multiplexer, the second from the top multiplexer is the 2nd multiplexer, and so forth until the bottom-most multiplexer is the dth multiplexer.

Incrementor 135, adds one to the mux output of the dth multiplexer thus producing a pre-rounding output. By adding one, incrementor 135 implements the "$2^{d-1}$" portion of the formula for $S_0$ as stated earlier. The need for incrementing by one is discussed below in the pre-rounding substage.

The shifters immediately to the right of the multiplexers shift the mux output, which is either X or Y, in order to multiply the mux output by the correct coefficient. For example, assume that c*numerator*X=(0100)*X, then X will need to be shifted two places to the left for it to be multiplied by $4_{decimal}$ ($0100_{binary}$). There are (d−1) shifters required in the combined multiplication stage which shift (d−1) mux outputs thus producing (d−1) mux shifting device outputs. In one embodiment, the (d−1) shifters are distributed such that the top-most shifter in the combined multiplication stage of FIG. 4 is the 1st shifter, the second from the top shifter is the 2nd shifter, and so forth until the bottom (and last) shifter is the (d−1)th shifter. In FIG. 4, the mux shifting device output of the 1st shifter is the mux output from the 2nd multiplexer shifted to the left one place by that 1st shifter, and if d is greater than two, the mux shifting device output of the 2nd shifter is the mux output from the 3rd multiplexer shifted to the left two places by that 2nd shifter, and continuing in this manner until the mux shifting device output of the (d−2)th shifter is the mux output from the (d−1)th multiplexer shifted to the left (d−2) places by that (d−2)th shifter. Finally, the mux shifting device output of the (d−1)th shifter is the pre-rounding output shifted to the left (d−1) places by that (d−1)th shifter.

Adder 110 in the combined multiplication stage of FIG. 4 is used to add together the (d−1) mux shifting device outputs from the (d−1) mux shifting devices and the mux output from the 1st multiplexer thus producing an adder output.

2. The Pre-rounding Substage

As stated earlier, rounding is usually done by adding ½ to the result and truncating the digits after the decimal point. If a fraction has a denominator that is odd then its binary representation would have an endless sequence of digits (for example, ⅓ is represented as $0.01010101\ldots_{binary}$). Because this invention uses an approximation for such fractions (for example, in the case of the fraction ⅓, the approximate fraction $0.01010101_{binary}$ might be used rather than the ideal fraction of $0.01010101\ldots_{binary}$). This approximate fraction is slightly less than the ideal fraction, therefore, the result of the division is an approximate result, that is slightly less than the ideal result. In rounding the result, to compensate for using an approximate fraction, a number which is slightly greater than ½ should be used.

Adding a number slightly greater than ½ is achieved by incrementor 135. By adding one to the mux output of the dth multiplexer, incrementor 135 is adding a cyclic number slightly greater than ½ ($0.1_{binary}$), the actual value added is dependent on the bit cycle length. After each adder, the number added for rounding purposes gets slightly larger. For example, if the bit cycle is 4 bits long (i.e., d=4 and as shown in the hardware implementation of FIG. 4), then after the first adder (i.e., after the combined multiplication stage), the number added is $0.1_{binary}$. After the second adder, the number added is $0.10001_{binary}$. After the third adder, the number added for rounding purposes is $0.1000100010001_{binary}$.

B. Division Stage

The division stage adjusts the result from the combined multiplication stage such that the desired precision is obtained. Every fraction whose denominator is odd has a cyclic binary representation. For example, $\frac{1}{7}=0.001001001\ldots_{binary}$, and $\frac{2}{5}=0.01100110\ldots_{binary}$. Each of the underlined digits in the above two examples are defined herein as a "bit cycle". If the number of bits in the bit cycle is d, then the denominator will divide $2^d-1$ such that the result of the division is a whole number. Therefore, d is the smallest integer such that the denominator divides $2^d-1$. Referring to the above two examples, when the denominator is 7, then d=3 since $2^3-\frac{1}{7}=1$ which is a whole number, and when the denominator is 5, then d=4 since $2^4-\frac{1}{5}=3$ which is also a whole number.

Due to the cyclic nature of the fraction, P, it is sufficient to multiply X by only the first d bits of P (this multiplication was done in the combined multiplication stage). The rest of the calculation is then simplified to merely shifting the result and adding it to itself, to reach the desired precision. Increasing the precision is done in the division stage. Shifting the result and adding it to itself is done "m" number of times. To compensate for the shifting of the result that was done to increase accuracy, the result is shifted to the right ($2^{m}*d$) places thus producing the final result.

For example, $\frac{2}{5}*49=0.01100110\ldots_{binary}*110001_{binary}=19.6=20$ (rounded). In this example, d=4, so if only the 4 underlined digits (the bit cycle) are multiplied, the result is: $0.0110*110001=10010.0110=18.4$. This result is imprecise (does not round to the correct answer of 20) because we have used 0.0110 as an approximation for ⅖. To improve precision, the next four digits in the bit cycle are accounted for by shifting the result 4 bits and adding it to itself resulting in the following: $10010.0110+1.00100110=10011.10000110=19.52=20$ (rounded). This result is more precise, because we have now used 0.01100110 as an approximation for ⅖.

Referring to the division stage of FIG. 4, shifter 130 is used to shift the result a specified number of places to the left and this shifted result is input into adder 110 in order to improve the precision of the result. Adder 110 is used to add together the result of the previous addition and that previous addition shifted a specified number of places by shifter 130. Shifter 130 is also used to shift the result a specified number of places to the right in order to compensate for the left shifting performed earlier to improve accuracy.

In the division stage, there are m number of shifters used to shift the output from the adders a specified number of places to the left thus producing m add shifting device outputs. In one embodiment, the m shifters are distributed such that the left-most shifter in the division stage is the 1st shifter, the next shifter to the right is the 2nd shifter, and continuing in this manner until the right-most shifter is the mth shifter.

In the division stage, there are m number of adders, each adder having two inputs and a result adding device output. One of the inputs to adder 110 is the result of the previous adder and the other input is that result shifted a specified number of places. In one embodiment, the m adders are distributed such that the left-most adder in the division stage is the 1st adder, the next adder to the right is the 2nd adder, and continuing in this manner until the right-most adder is the mth adder.

In the division stage of FIG. 4, the result adding device output of the 1st adder is the addition of both the adder output from the combined multiplication stage and the adder output shifted to the left d places by the 1st shifter. If m is greater than one, then the result adding device output of the 2nd adder is the addition of both the result adding device output of the 1st adder and that output shifted to the left 2*d places by the 2nd shifter. Continuing in this manner, the result adding device output of the mth adder is the addition of both the result adding device output of the (m-1)th adder and that output shifted to the left ($2^{m-1}*d$) places by the mth shifter.

Finally, shifter 130 is used to shift the result adding device output of the mth adder to the right ($2^{m}*d$) places thus producing the intermediate value of X and Y given a fraction P. This right shifting performed by shifter 130 is required to compensate for the previous left shifting done in the division stage in order to improve the precision of the result.

IV. Example of How the Hardware Calculates the Blending Function

Figure 5:
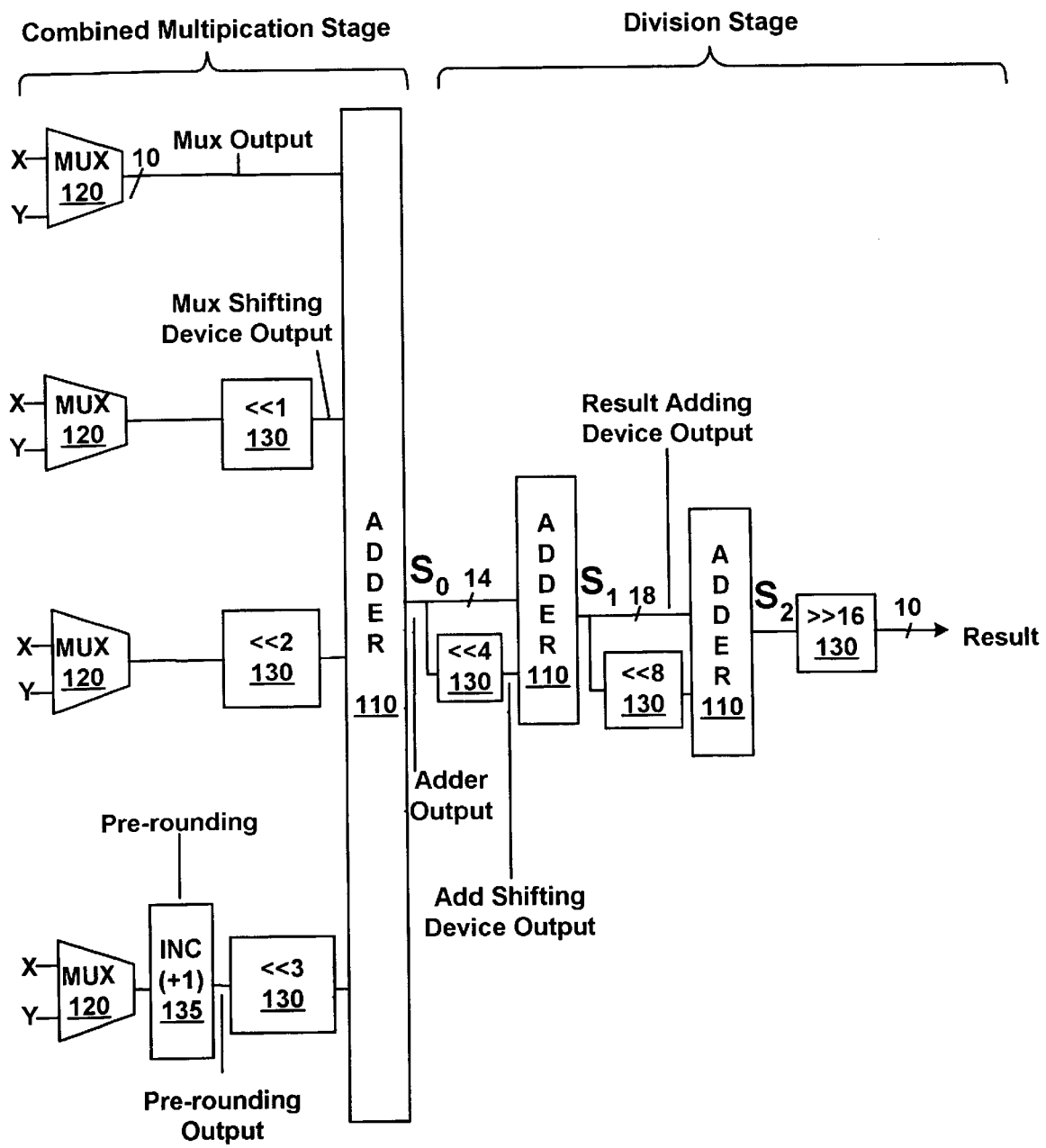
FIG. 5 is a block diagram illustrating the hardware involved in calculating an intermediate value in an embodiment of the present invention where certain parameters are defined.

FIG. 5 is a block diagram illustrating how the hardware implementing the blending function calculates an intermediate value given the following values: X (the first end value)=799; Y (the second end value)=250; both X and Y are 10 bits wide (n=10); and P (the fraction)=⅖ thus the numerator is 2 and the denominator is 5. Using these values, the blending function, round(P*X+(1−P)*Y), produces the following result: round ($\frac{2}{5}*799+\frac{3}{5}*250$)=round(319.6+150)=round(469.6)=470.

Referring to step 200 of FIG. 3, d has the value 4 since 4 is the smallest integer such that $(2^d-1)/$(the denominator) results in the whole number 3. Referring to step 205, c equals $(2^4-1)/5$ which is 3. Referring to step 210, m equals 2, since 2 is the smallest integer such that $2^2 \geq (10+4)/4$. Referring to step 215, c*(numerator)*X+c*(denominator−numerator) *Y=6*X+9*Y=$0110_{binary}*X+1001_{binary}*Y$ Therefore, Y should be selected from the top-most and bottom-most multiplexers in FIG. 5 while X should be selected from the two middle multiplexers.

Referring to FIG. 5, in order to implement the blending function given the above parameters, the following hardware is required: 4 multiplexers (i.e., d multiplexers) which select either X or Y, 3 shifters (i.e., d−1shifters), 1 incrementor, one adder with 4 inputs (i.e., d inputs) and one output, 2 shifters (i.e., m shifters in the division stage), 2 adders (i.e., m adders in the division stage) with 2 inputs and one output, and one shifter (i.e., the right shifter).

Multiplexer 120 selects either X or Y as the mux output. Using the numbering presented in Section III(A), the 1st multiplexer (the top-most multiplexer) selects Y so its mux output equals 250. The 2nd multiplexer selects X so its mux output equals 799. The 3rd multiplexer also selects X so its mux output equals 799. The 4th multiplexer (the bottom-most multiplexer) selects Y so its output equals 250. Incrementor 135 increments by one the mux output from the 4th multiplexer thus producing the pre-rounding output which equals 251.

Shifter 130 in the combined multiplication stage produces a mux shifting device output by shifting its input a specified number of places to the left. Using the numbering presented in Section III(A), the mux shifting device output of the 1st shifter (the top-most shifter in the combined multiplication stage) is the mux output of the 2nd multiplexer which is 799 shifted to the left one place which results in 1598. The mux shifting device output of the 2nd shifter (the middle shifter) is the mux output of the 3rd multiplexer which is 799 shifted to the left by two places which results in 3196. The mux shifting device output of the 3rd shifter (the bottom shifter) is the pre-rounding output shifted to the left three places which results in 2008.

Adder 110 in the combined multiplication stage produces the adder output which is the addition of the following four inputs: the mux output of the 1st multiplexer, the mux shifting device output of the 1st shifter, the mux shifting device output of the 2nd shifter, and the mux shifting device output of the 3rd shifter. The addition of these four inputs produces the adder output of 7052 which represents $S_0$ in FIG. 5.

Adder 110, in the division stage, is used to increase the result's precision by adding together the result of the previous addition and that result shifted, by shifter 130, a specified number of places to the left. $S_1$ is found by adding together $S_0$ and $S_0$ shifted to the left four places which results in 119884. $S_2$ is found by adding together $S_1$ and $S_1$ shifted to the left eight places which results in 30810188. $S_2$ is shifted to the right sixteen places, by shifter 130, thus producing the result of 470 which is the intermediate value between X and Y.

Figure 1A:
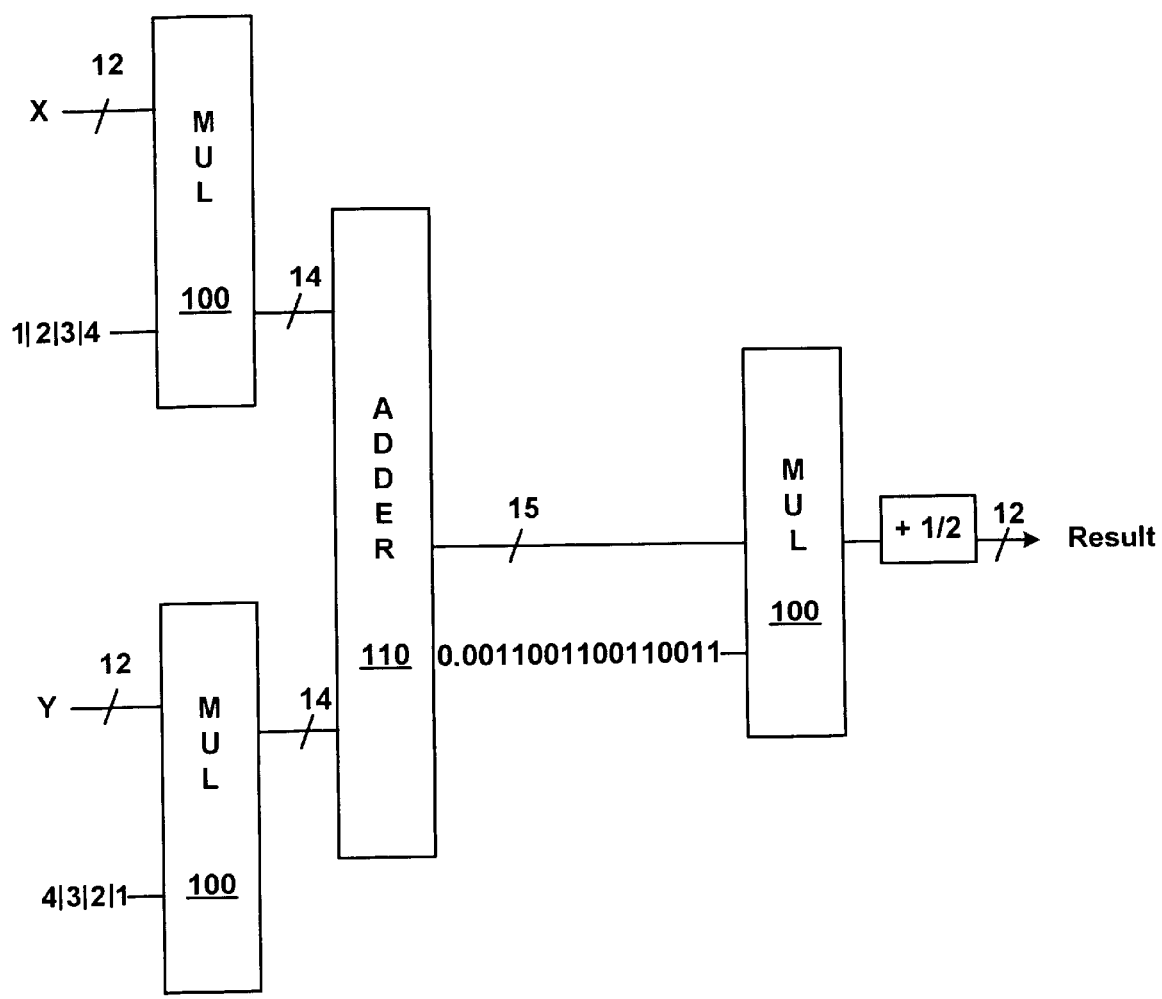
FIG. 1a is a block diagram illustrating the hardware involved in a typical, intuitive implementation of the blending function as known in the art.
Figure 1B:
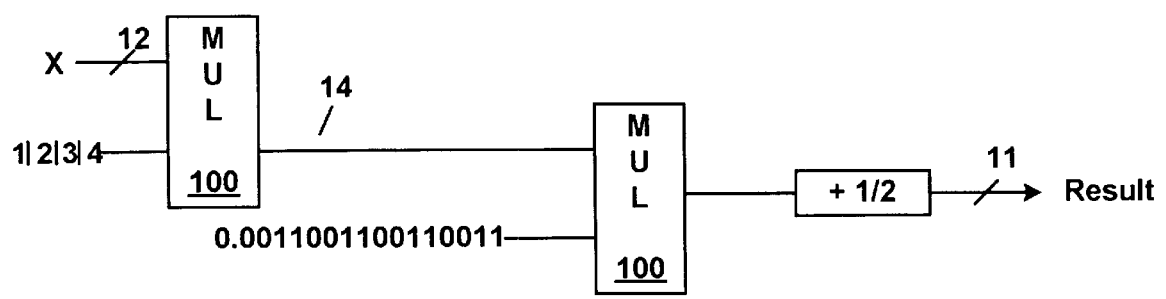
FIG. 1b is a block diagram illustrating the hardware involved in a typical, intuitive implementation of multiplying a value by a fraction as known in the art.

In comparing the most efficient implementation of FIG. 1a with the implementation of the present invention shown in FIG. 5, the most efficient implementation of FIG. 1a requires 2415 gates, however, the implementation shown in FIG. 5 requires only 1188 gates. Thus 51% less area is required to implement the blending function using the present invention even considering that both implementations provide for the same 12-bit precision of the final result.

V. Method Steps for Multiplying a Value by a Fraction

In an alternative embodiment, the present invention can also be used to multiply a value by a fraction. This operation has the following formula: round(P*X), where the value, X, is a binary integer that is n bits wide and has a value between 0 and $2^n-1$. P is a fraction having a numerator and a denominator and where the denominator is a constant and an odd number and the numerator is between 0 and the denominator.

Figure 6:
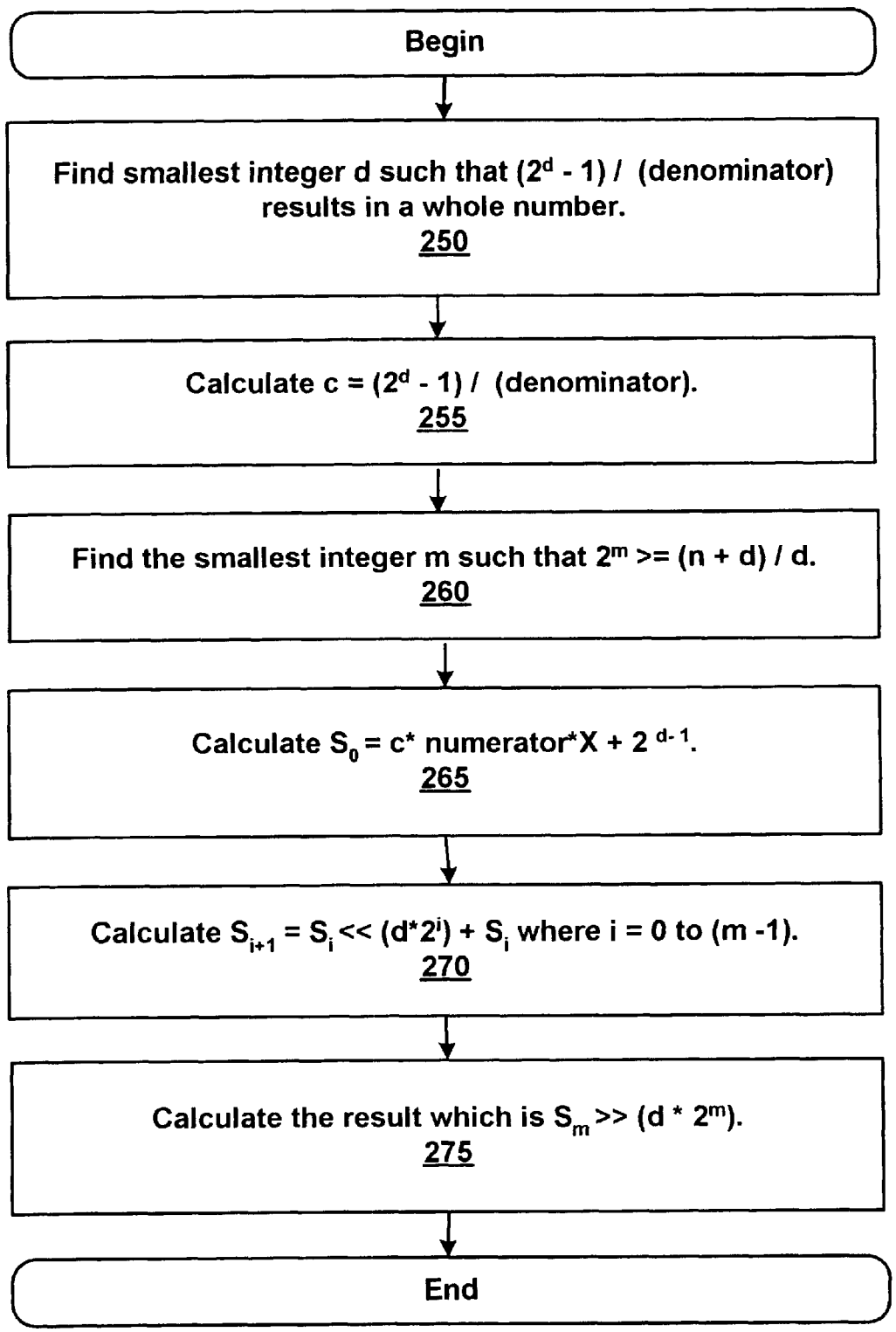
FIG. 6 is a flowchart illustrating the steps required to multiply a value by a fraction in an alternative embodiment of the present invention.

FIG. 6 is a flowchart illustrating the steps required to multiply a value by a fraction in an alternative embodiment of the present invention. Steps 250, 255, and 260 are pre-implementation steps in that these steps calculate constants needed for the actual hardware implementation for multiplying a value by a fraction. The actual hardware is implemented using steps 265, 270, and 275. In step 250, the smallest integer, d, is found such that $(2^d-1)/$(the denominator) results in a whole number. In step 255, the number c is calculated where $c=(2^d-1)/$(the denominator). In step 260, the smallest integer m is found such that $2^m \geq (n+d)/d$. In step 265, an initial result $S_0$ is calculated such that $S_0=c*$(numerator)$*X+2^{d-1}$. In step 270, the intermediate results $S_{i+1}$ (i.e., $S_1$ to $S_m$) are calculated where $S_{i+1}=S_i+S_i<<(d*2^i)$ and where i=0 to (m−1). In other words, $S_{i+1}$ equals $S_i$ plus $S_i$ shifted to the left by $(d*$ by $2^i)$ places. Finally, in step 275, $S_m$ is shifted to the right by $(d*2)$ places thus producing the result of multiplying a value by a fraction.

Steps 250 to 275 calculate values that depend only on the denominator. If the denominator is constant, then c, d, and m are known before hardware implementation and thus the implementation starts at step 265. The multiplications in step 265 can be simplified due to the special characteristics of c. The coefficient (c*numerator) when represented in d binary digits has at most d "1"s. This means that the function c*numerator*X can be implemented using only one adder with d inputs.

VI. Hardware Implementation for Multiplying a Value by a Fraction

Figure 7:
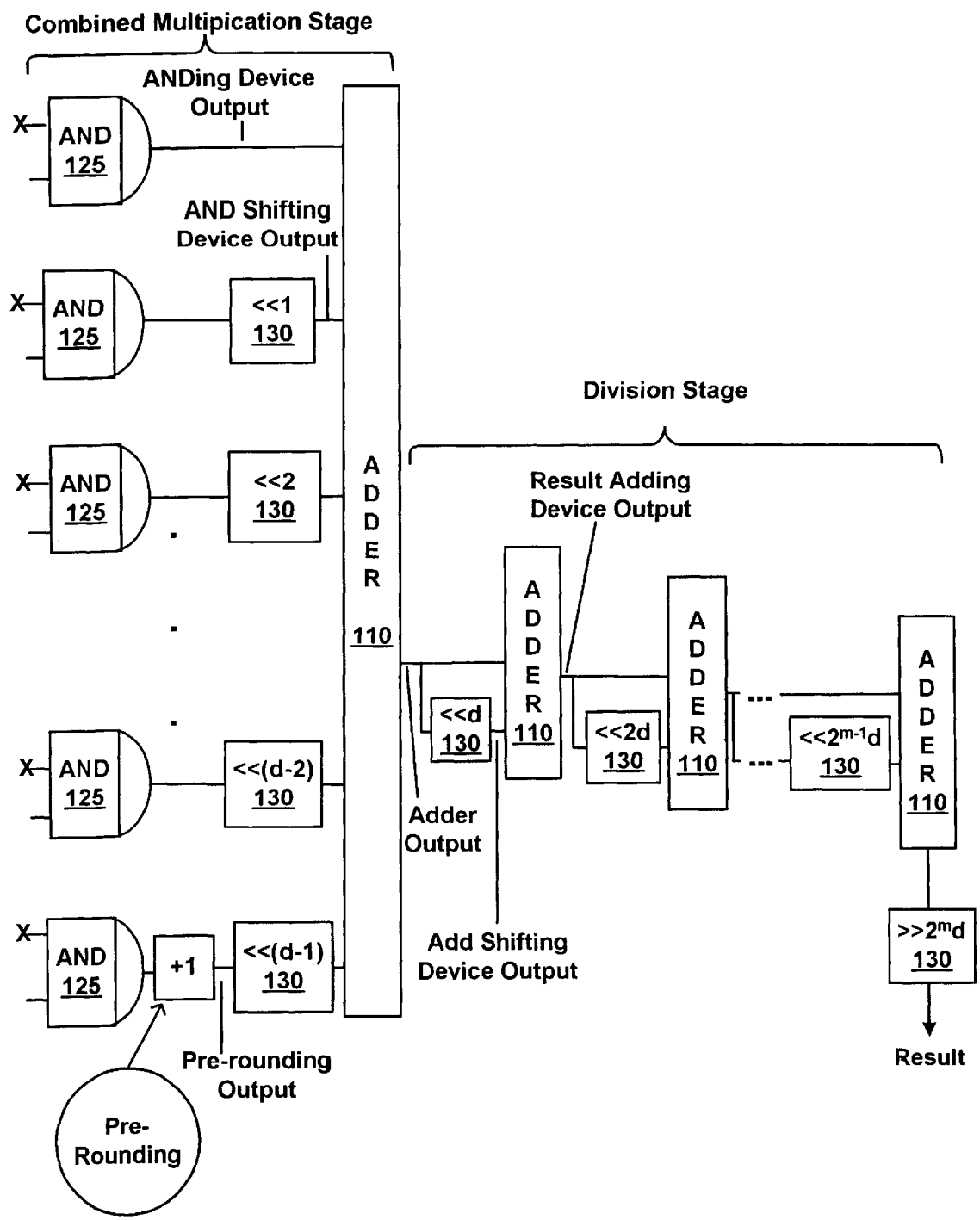
FIG. 7 is a block diagram illustrating the hardware involved in multiplying a value by a fraction in an alternative embodiment of the present invention.

FIG. 7 is a block diagram illustrating the hardware involved in multiplying a value by a fraction in an alternative embodiment of the present invention. An ANDing device, such as an AND-gate 125, is used to set the output given two inputs. AND-gate 125 has as its inputs the value, X, and a "1" or "0". Having a value of "1" is defined as the voltage input into AND-gate 125 being a value other than 0 volts (e.g.,+5 volts is a typical voltage for the value "1"). Having a value of "0" is defined as the voltage input into AND-gate 125 being 0 volts. If the input is a "1" then the output of AND-gate 125 is X, however, if the input is "0" then the output of AND-gate 125 is "0". In one embodiment, one of the inputs to each of the AND-gates is a bit signal which is a binary representation based on (c*numerator) is the select input which is used to select either X or Y as the output of multiplexer 120. All the other devices in FIG. 7 have already been described in the previous section on hardware implementation of the blending function, and therefore will not be described here.

As stated earlier, the implementation for c*(numerator)*X is simplified due to the special characteristics of c. Thus the function c*numerator*X has at most d 1's and therefore can be implemented using only one adder with d inputs. For example, assume that d=4 and c*(numerator)*X=0110*X. In this case, the middle two AND-gates have 1's as one of the inputs and thus these AND-gates have X as an output. The top and bottom AND-gates have 0's as one of the inputs and thus these AND-gates have 0 as an output.

In FIG. 7, there are d number of AND-gates, each of the AND-gates is used to set an ANDing device output to either X or 0. In one embodiment, the d AND-gates are distributed such that the 1st AND-gate is the top-most AND-gate, the second from the top AND-gate is the 2nd AND-gate, and so forth until the bottom AND-gate is the dth AND-gate.

Incrementor 135, adds one to the ANDing device output of the dth AND-gate thus producing a pre-rounding output. By adding one, incrementor 135 implements the "$2^{d-1}$" portion of the formula for $S_0$ as stated earlier.

Shifter 130 shifts the ANDing device output which is either X or "0" in order to multiply the ANDing device output by the correct coefficient. For example, assume that c*numerator*X=(0100)*X, then X will need to be shifted two places to the left for it to be multiplied by $4_{decimal}$ ($0100_{decimal}$). There are (d−1) shifters required in the combined multiplication stage in order to shift (d−1) ANDing device outputs thus producing (d−1) AND shifting device outputs.

In one embodiment, the (d−1) shifters are distributed such that the 1st shifter is the top-most shifter in the combined multiplication stage of FIG. 7, the second from the top shifter is the 2nd shifter, and continuing in this manner until the bottom shifter is the (d−1)th shifter. In FIG. 7, the AND shifting device output of the 1st shifter is the ANDing device output from the 2nd AND-gate shifted to the left one place by that 1st shifter and if d is greater than 2, then the AND shifting device output of the 2nd shifter is the ANDing device output from the 3rd AND-gate shifted to the left two places by that 2nd shifter, and continuing in this manner until the AND shifting device output of the (d−2)th shifter is the ANDing device output from the (d−1)th AND-gate shifted to the left (d−2) places by that (d−2)th shifter. Finally, the AND shifting device output of the (d−1)th shifter is the pre-rounding output shifted to the left (d−1) places by that (d−1)th shifter.

Adder 110 in the combined multiplication stage of FIG. 7 is used to add together the (d−1) AND shifting device outputs from the (d−1) shifters and the ANDing device output from the 1st AND-gate thus producing an adder output.

The division stage of FIG. 7 is identical to the division stage of FIG. 4 described earlier and will not be repeated here.

Dividing a value by an odd number is usually a difficult task in hardware requiring a large number of gates. However, the present invention can be used to efficiently perform this operation by multiplying by its inverse. For example, instead of calculating A/9, this invention can be used to calculate the following: A*(1/9).

The hardware for the blending function as shown in FIG. 4 can also be used to multiply a value by a fraction (i.e., perform P*X) by setting the second end value, Y, to zero. In other words, the hardware for calculating P*X+(1−P)*Y can also be used to efficiently calculate just P*X by setting Y equal to zero.

Although embodiments are specifically illustrated and described herein, it will be appreciated that modifications and variations of the present invention are covered by the above teachings and within the purview of the appended claims without departing from the spirit and intended scope of the invention.

What is claimed is:

1. An apparatus that calculates an intermediate value between a first value, X, and a second value, Y, the intermediate value being approximately equal to P*X+(1−P)*Y, wherein P is a non-zero, non-unitary fraction value with an odd number denominator and P*X is n bits wide, the apparatus comprising:
 a multiplication stage comprising:
  one or more (1 to d) multiplexing devices, each having inputs to receive the first value X and the second value Y and outputting one of value X and value Y;
  an incrementing device incrementing the output of a predetermined one of the two or more multiplexing devices by a value of one,
  a first set of (1 to d−1) mux shifting devices wherein the output of a first mux shifting device is the output of a second multiplexing device shifted to the left one place, and continuing in this manner wherein the output of the (d−2)th mux shifting device is the output of the (d−1)th multiplexing device shifted to the left (d−2) places and finally, the output of the (d−1)th mux shifting device is the output of the incrementing device shifted to the left (d−1) places; and
  an adder having a total of (1 to d) inputs to receive the outputs of the (1 to d−1) mux shifting devices and the output of the first multiplexing device; and
 a division stage coupled to the multiplication stage comprising:
  a second set of mux shifting devices (1 to m), each having an input and an output, wherein m is a smallest integer where $2^m \geq (n+d)/d$;
  a set of adding devices (1 to m), where the output of the 1st adding device is the addition of an output from the adder of the multiplication stage and that output shifted (d) places to the left by the 1st mux shifting device of the second set; and
  if m is greater than 1, then the output of the 2nd adding device is the addition of the output from the 1st adding device of the set of adding devices and that output shifted (2*d) places to the left by the 2nd mux shifting device of the second set; and continuing in this manner until the output (m)th adding device of the set of adding devices is the addition of the output of the (m−1)th adding device of the set of adding devices and that output shifted $(2^{m-1} *d)$ places to the left by the (m)th mux shifting device of the second set; and
  a decisive mux shifting device that shifts the output from the (m)th adding device to the right by (2m*d) places to produce the intermediate value.

2. An apparatus that calculates an intermediate value between a first value, X, and a second value, Y, the intermediate value being approximately equal to P*X+(1−P)*Y, where P is a non-zero, non-unitary fraction value with an odd number denominator, the apparatus comprising:
 a multiplication stage, the multiplication stage comprising one or more multiplexers, one or more adders and one or more shifters that calculate an initial result $S_o$, where $$S_o = (c*(\text{numerator})*X) + (c*(\text{denominator}-\text{numerator})*Y) + 2^{d-1},$$

wherein, d is the smallest integer such that $(2^d-1)$ divided by the denominator is a whole number, c equals $(2^d-1)$ divided by the denominator and one integer m is such that the smallest integer where $2^m \geq (n+d)$ divided by d;
 a division stage that further comprises
 one or more adding devices; and
 one or more shifters that calculate (incrementally from 1 to m), a value $S_{i+1}$, where i equals 0 to (m−1), and $S_{i+1} = S_i$ plus $S_i$ shifted to the left by $(d*2^i)$ places; and
 a decisive shifter to the shift the resulting $S_m$ to the right by (d times $2^m$) places, to output the intermediate value.

3. A method for calculating an intermediate value between a first value, X, and a second value, Y, as P*X+(1−P)*Y where P is a non-zero, non-unitary fraction value with an odd number denominator, the method comprising:
 finding a smallest integer d such that $(2^d-1)$ divided by the denominator is a whole number;
 calculating a number c such that c equals $(2^d-1)$ divided by the denominator;

finding an integer m such that m is a smallest whole number where $2^m \geq (n+d)$ divided by d;

calculating an initial result $S_o$, where $$S_o = (c*(\text{numerator})*X) + (c*(\text{denominator}-\text{numerator})*Y) + 2^{d-1};$$

calculating (1 to m) $S_{i+1}$ where i equals 0 to (m−1) and $S_{i+1} = S_i$ plus $S_i$ shifted to the left by $(d*2^i)$ places; and shifting $S_m$ to the right by (d times $2^m$) places which produces the intermediate value.

4. The method of claim 3 wherein the initial result $S_o$ has (d) ones in a first binary representation of c multiplied by the numerator and in a second binary representation of c multiplied by (the denominator minus the numerator) wherein and the first binary representation and the second binary representation are an inverse of each other.

5. A computer system comprising:

a processor, a bus connected to the processor, a graphics controller connected to the bus, the graphics controller comprising:

an apparatus that calculates an intermediate value between a first value, X and a second value, Y, the intermediate value being approximately equal to $P*X + (1-P)*Y$ where P is a non-zero, non-unitary fraction value with an odd number denominator, the apparatus comprising:

a combined multiplication stage including one or more multiplexing devices, each having inputs to receive the first and second values, and each having a select input to receive a bit signal based on a numerator of the fraction value multiplied by a constant, c, and an adder coupled to outputs of the multiplexing devices; and a display device that displays output from the graphics controller; wherein c equals $(2^d-1)$ divided by the denominator, and integer d is the smallest integer such that the denominator divides $(2^d-1)$.

6. The computer system of claim 5, further comprising a division stage including a set of adding devices, connected in series, each having an input and an output, each of the adding devices generating an output value that is more precise than its input value.

* * * * *

UNITED STATES PATENT AND TRADEMARK OFFICE
CERTIFICATE OF CORRECTION

PATENT NO. : 6,584,483 B1
DATED : June 24, 2003
INVENTOR(S) : Tom Altus et al.

It is certified that error appears in the above-identified patent and that said Letters Patent is hereby corrected as shown below:

<u>Column 7,</u>
Line 29, "1/7=0.001001001" should be -- 1/7=0.<u>001</u>001001 --
Line 29, "2/5=0.01100110" should be -- 2/5=0.<u>0110</u>0110 --
Line 50, "49=0.01100110" should be -- 49=0.<u>0110</u>0110 --

Signed and Sealed this

Fourth Day of January, 2005

JON W. DUDAS
*Director of the United States Patent and Trademark Office*